United States Patent [19]
Baier et al.

[11] Patent Number: 5,650,952
[45] Date of Patent: Jul. 22, 1997

[54] CIRCUIT ARRANGEMENT FOR FORMING THE SUM OF PRODUCTS

[75] Inventors: Alfred Baier, Eckental; Johannes Schuck, Röthenbach/Peg.; Dirk Weinsziehr, Schnaittach, all of Germany

[73] Assignee: U.S. Philips Corporation, New York, N.Y.

[21] Appl. No.: 695,951

[22] Filed: Aug. 13, 1996

Related U.S. Application Data

[63] Continuation of Ser. No. 290,800, filed as PCT/NL93/00267, Dec. 27, 1993, published as WO94/15278, Jul. 7, 1994, abandoned.

[30] Foreign Application Priority Data

Dec. 18, 1992 [DE] Germany .................. 42 42 929.3

[51] Int. Cl.$^6$ ............................................. G06F 7/00
[52] U.S. Cl. ............................................. 364/750.5
[58] Field of Search .................. 364/736, 750.5, 364/754, 755, 756, 757, 758, 759, 760

[56] References Cited

U.S. PATENT DOCUMENTS

| | | | |
|---|---|---|---|
| 4,025,772 | 5/1977 | Constant | 364/754 X |
| 5,128,890 | 7/1992 | Girardeau, Jr. | 364/757 |

FOREIGN PATENT DOCUMENTS

| | | |
|---|---|---|
| 0042452 | 12/1981 | European Pat. Off. . |
| 2008294 | 5/1979 | United Kingdom . |

OTHER PUBLICATIONS

"Overflow Detection in Multioperand Addition" P. Pai et al, Journal of Electronics, 73(1992) Sep. No. 3, London.

*Primary Examiner*—Chuong D. Ngo
*Attorney, Agent, or Firm*—Debra K. Stephens

[57] ABSTRACT

In processors, notably digital signal processors, it is often necessary to form the sum of products of a concatenation of data word pairs, for example for correlation or convolution operations, in which the one data word of each pair can assume only one of the two values +1 or −1. In accordance with the invention, in that case instead of forming a product in a multiplier, the one data word of each pair is applied to an add/subtract device in order to control the function thereof in respect of addition or subtraction; one input of the add/subtract unit then receives the other data words of the data word pairs, and the other input is connected to the output of the accumulator register. Thus, a complex multiplier device is saved or, should such a device be present anyway, it will not be used so that the power loss of the processor is reduced.

8 Claims, 2 Drawing Sheets

CIRCUIT ARRANGEMENT FOR FORMING THE SUM OF PRODUCTS

This is a continuation of application Ser. No. 08/290,800, filed as PCT/NL93/00267 Dec. 27, 1993, published as WO94/15278, Jul. 7, 1994, now abandoned.

The invention relates to a circuit arrangement for forming the sum of products of a concatenation of data word pairs, comprising an add/subtract device whose function can be switched over via first control inputs, notably in respect of addition and subtraction, at least one accumulator register, an output of which can be coupled to an output of the add/subtract device and an output of which can be coupled to an input of the add/subtract device, and also comprising a control device for controlling the successive processing of the products.

BACKGROUND OF THE INVENTION

Arithmetical operations of this kind occur notably in digital signal processors and serve, for example, to realize scalar products as well as time-discrete correlation, filter and convolution operations. In order to enable fast execution of such operations there is customarily provided a multiplier device which successively receives both data words of each pair and whose output is connected to one input of the add/subtract device, the other input of this device being connected to the output of the device via a so-called accumulator register. When the device is suitably constructed, a multiplication/accumulation step as well as the required data word transfers can be executed within a single instruction cycle of the processor. The formation of the overall sum then requires merely a number of instruction cycles which is equal to the number of data word pairs plus some preparatory instructions.

Many fields of digital signal processing application also involve summing of products of a concatenation of data word pairs where one data word of each pair can assume only one of the two values +1 or −1. Examples of such fields of application are scalar products as well as time-discrete correlation, filter and convolution operations with binary bipolar coefficients as they occur in signal processing whenever binary signals are used.

The formation of such a sum by means of a multiplier device with a subsequent add/subtract device leads to uneconomical use of the multiplier, because it performs merely multiplications by the factors +1 or −1 on the respective other data words of the pairs, i.e. it realizes merely a conditional change of sign of these data words.

U.S. Pat. No. 4,849,922 discloses an arrangement of the kind set forth in which the multiplier is realised by arithmetically shifted additions or subtractions. The construction of this known device is somewhat simpler than that of a parallel multiplier device for data words with many positions, but such an arrangement is again uneconomically used for multiplications by merely the factors +1 and −1.

SUMMARY OF THE INVENTION

Therefore, it is an object of the invention to provide a circuit arrangement of the kind set forth which is fast and has a simple construction for said special case of the values for the one data words.

This object is achieved in accordance with the invention in that for the processing of data word pairs in which the one data word of each pair is supplied as one of the two bit values +1 or −1 the control device applies the individual values of the one data words successively to at least one of the first control inputs of the add/subtract device and executes in parallel therewith the supply of the other data words of each pair to another input of the add/subtract device.

The multiplication by the values +1 and −1 during the summing in accordance with the invention is only replaced by corresponding control of the add/subtract device in that the other data words directly control the function of the add/subtract device in respect of addition or subtraction. Thus, in each instruction cycle there is performed a multiplication-accumulation step without it being necessary to use a multiplier device. However, should such a device be present anyway to process also general data word pairs, the processing of the data words in the special case generally involves a smaller power loss because no signal transitions occur in the multiplier device.

The add/subtract device can be controlled so that the value of the one data word of each pair is applied directly to the control input, whereas essentially simultaneously the other data word of the pair is applied to the other input of the add/subtract device. However, this always requires two transport operations for data words for each pair. In order to simplify this operation, a version of the invention is characterized in that there is provided a register which stores in parallel the values of the one data words of at least a part of the concatenation of data word pairs and an output of which is connected to at least one of the first control inputs of the add/subtract device, the register being a shift register which comprises a number of stages which can be filled in parallel, an output of one of these stages constituting the output of the register, the contents of the register being bit-wise shiftable by first control signals from the control device. The register thus takes up the one data words of a number of successive pairs in parallel and outputs these words serially, i.e. say under the control of the control device which also controls the supply of the other data words to the add/subtract device. Thus, each step requires only one data word transport. Even more general control of the processing of data words is possible in a further embodiment in that the contents of the register can be shifted in a selectable direction in dependence on the first control signals from the control device, and in that the register can be closed as an end-around coupled shift register.

If the output of the register were connected directly to a control input of the add/subtract device, the function thereof would in principle be dependent on the contents of the register, so that the possibilities of use of the add/subtract device might be limited. Therefore, in a further embodiment of the invention the function of the add/subtract device can only be controlled, via the control input connected to the output of the register, in dependence on at least one second control signal from the control device. This enables cancellation of the effect of the register on the function of the add/subtract device. This can be achieved in the simplest manner by connecting the output of the register to a control input of the add/subtract device via a logic circuit which also receives the second control signal. This allows for attractive functions to be achieved, an example of which will be described in detail hereinafter.

A circuit arrangement in accordance with the invention can advantageously be used in a processor, notably a digital signal processor, comprising at least one data bus. The stages of the register are then preferably coupled to the data bus and take over the data present on the data bus under the control of a third control signal from the control device. The transfer of the one data words to the register is thus carried out in the same way as the transfer of the other data words of the pairs by the control device. Preferably, the control device is then formed essentially by the instruction decoder of the processor. The output of the register may then be connectable to the data bus in the same way as further registers in a processor, so that this register can, generally speaking, also be used for the intermediate storage of an arbitrary word.

When the circuit arrangement in accordance with the invention is used in a processor, the control device, as an instruction decoder, preferably generates an active value of the first and the second control signal only in response to the appearance of a predetermined instruction cede. Because of this directly instruction-dependent control of the register and the add/subtract device, for example the arithmetical functions x−y and x+y can be executed for two data words x and y, in dependence on the value of the first control signal, by means of a special instruction during an instruction clock cycle.

BRIEF DESCRIPTION OF THE DRAWING

Embodiments of the invention will be described in detail hereinafter with reference to the drawing. Therein.

DESCRIPTION OF THE PREFERRED EMBODIMENTS

Figure 1:
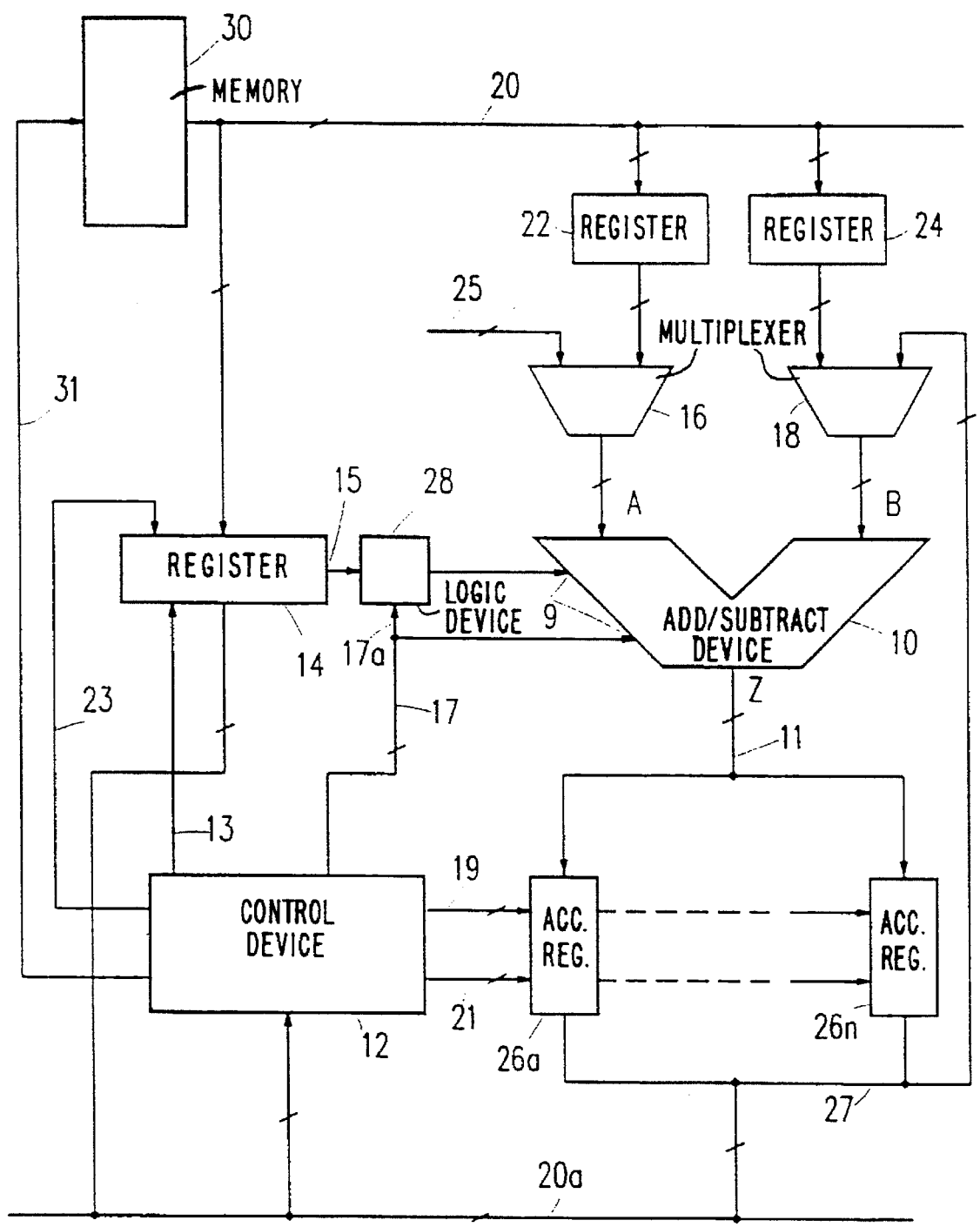
FIG. 1 shows a block diagram of an arrangement in accordance with the invention.

FIG. 1 shows a general block diagram of a part of a processor, notably a signal processor. An essential element thereof is formed by an add/subtract device 10 which is generally constructed as a so-called arithmetic and logic unit whereby not only simple addition or subtraction of two data words can be performed, but also further arithmetical and logic functions with these data words; this can be controlled via a number of control inputs 9, except for addition and subtraction these further functions being irrelevant in this context. The result of the processing function appears on an output Z which is in this case connected, via a connection 11, to a number of accumulator registers 26a to 26n, the result appearing on the output Z being transferrable to one of these registers under the control of control signals on the line 19. The use of a plurality of registers is efficient for many functions of the processor, but for the function to be described hereinafter one register would also suffice.

It is to be noted that the connection 11 as well as the connections leading to the inputs A and B and further connections and lines shown, provided with a stroke, in reality consist of a number of parallel lines via which the data words are customarily transported in parallel.

The contents of one of the registers 26a to 26n can be read by way of control signals via a line 21, and be applied to the input B of the unit 10 via the connection 17 and a multiplexer 18. Like the multiplexer 16, the multiplexer 18 is controlled, via control lines (not shown for the sake of simplicity), by the control device 12 which also feeds the control lines 19 and 21 as well as further control lines yet to be described. This control device constitutes essentially the instruction decoder for decoding the instruction words successively read from an instruction memory (not shown) and supplied via a data bus 20a. This data bus 20a can also receive the contents read from one of the registers 26a to 26n.

In dependence on its control signal, the multiplexer 18 connects either the connection 27 or the output of a register 24 to the input B of the unit 10. Similarly, the multiplexer 16 connects, in dependence on its control signal, the output of a register 22 or a connection 25, originating from other elements of the processor (not shown), to the input A of the unit 10. The registers 22 and 24 are controlled to store each time a data word, preferably again under the control (not shown) of the control device 12, which data word is supplied, for example by a memory 30 via a data bus 20. The data bus 20 may be identical to the clam bus 20a, but it is alternatively possible to use more than two data buses, it then being possible for the registers 22 and 24 to be connected to different data buses.

The arrangement described thus far operates as an accumulator when the multiplexer 18 is controlled so that the connection 27 is connected to the input B. Each new data word applied to the input A via the register 22 and the multiplexer 16 is then added to the contents of one of the registers 26a to 26n and is preferably stored in this register again. Thus, a sum of a number of successively supplied data words is formed.

It will often be necessary to form not only the sum of a concatenation of data words, but also the sum of the products of a concatenation of data word pairs, where the one data word of each pair can have only the value +1 or −1. Each of these one data words thus has a length of only one bit and represents, for example a coefficient. For the processing of such a concatenation of products there is provided a register 14 which receives the bits of the one data words of a concatenation of data word pairs in parallel via, for example the bus 20 and which writes this data under the control of a control signal on the line 23 from the control device 12. The register 14 is constructed as a shift register which comprises a number of stages, each stage storing one bit of the data word supplied; via a control signal on the line 13 from the control device 12, the contents of all stages can be shifted in parallel so that the contents of each stage successively appear on an output 15 of the register 14. This output 15 is connected, via a device 28 to be described hereinafter, to a control input 9 of the add/subtract unit 10 and the add/subtract unit 10 is switched either to addition or subtraction depending on the value of the bit appearing on the output 15, i.e. of the one data word of a data word pair.

The control signals on the line 13 thus determine which one data word of each pair appears on the output 15 of the register 14, and via a control line 31 the memory 30 is controlled so that it reads the other data word associated with the data word pair and applies it, via the data bus 20 and the register 22, to the input A of the unit 10. In dependence on the bit value on the output 15, the applied data word is then added to or subtracted from the intermediate result accumulated thus far.

Taking into account the transit times and delays in the individual elements, the actual timing is such that first the one-bit values of the one data words are transferred to the register 14 and subsequently the other data word of a data word pair is read from the memory and applied to the register 22, after which this data word is taken up by the register 22 and appears on the output A after a short delay, at the same time the register 14 receiving a write signal so that the associated one data word of this pair appears on the output 15 and hence on the control input 9 of the unit 10. This shift signal for the register 14, however, can also be generated briefly before the writing of the new data word into the register 22, or preferably briefly after the processing of each of the other data words, so that the add/subtract unit 10 has already been prepared for its new function when a new other data word appears on the input A.

In order to prevent control of the function of the add/subtract unit 10 by the signal on the output 15 of the register when it is used for an arithmetical operation other than the formation of the sum of a concatenation of products, a logic device 28 is connected between the output 15 and the control input 9 of the unit 10, which logic device is controlled by the control device 12 via a control lead 17a. Thus, via the control lead 17a it can be prevented that the function of the unit 10 is influenced by the signal on the output 15, so that in that case the function is controlled exclusively by the signals on the control line 17 from the control device 12.

Furthermore, the outputs of all stages of the register 14 are connected parallel to the data bus 20a and the contents of all stages can be transferred to this data bus 20a by way of a corresponding control signal from the control device 12. The register 14 can thus also be used as an arbitrary storage register when the special function for controlling the add/subtract device is temporarily not required.

Figure 2:
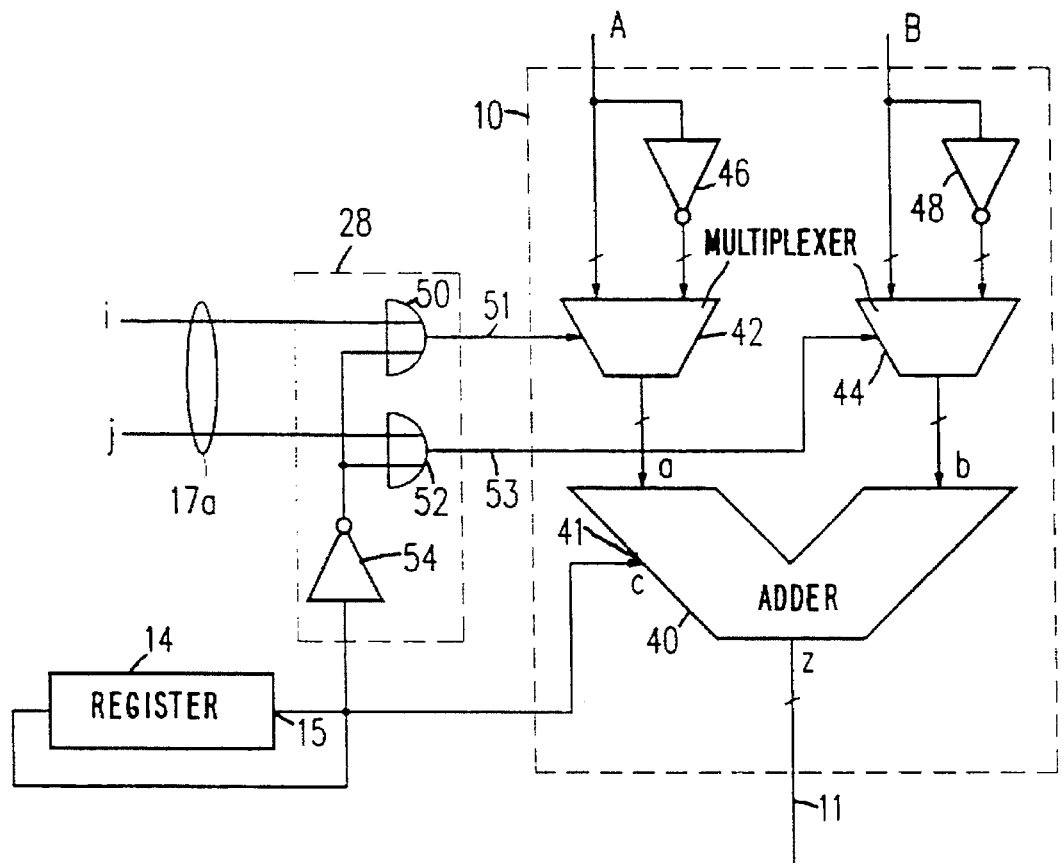
FIG. 2 shows an example of logic combination of the register output with control signals.

FIG. 2 shows an example of the construction of the logic device 28, as well as of the construction of the add/subtract device 10 which, however, can actually execute only additions or subtractions in this case. The subtraction is performed in two's-complement form, i.e. the complement of the value to be subtracted as well as an additional unit of the lowest position are added. To this end, the add/subtract unit 10 comprises an adder 40 whose inputs a and b receive the data words applied to the inputs A and B of the unit 10, via the multiplexer 42 and 44, respectively, either directly or via the inverter stages 46 and 48, in complement form. The adder 40 also comprises a carry unit 41 which receives the output 15. The output Z of the adder 40 is connected to the connection 11.

This device enables the two functions $A-Bk_i$ or $B-Ak_i$ to be executed, $k_i$ being a coefficient having the value +1 or −1, depending on the binary value present on the output 15 of the register 14. For this purpose there are provided two special instructions, and for the first function the control device 12 in FIG. 1 produces a logic "1" on the line i within the control line 17a, which logic "1" is applied to one input of an OR-gate 50 in the device 28, so that also the line 51 continuously carries a logic "1" and the multiplexer conducts the data word on the input A without modification. The signal on the other input of the OR-gate 50 is then irrelevant. The line j carries a logic "0" and when the line 15 also carries a logic "0" in conformity with k=−1, the inverter 54 generates a logic "1" on the line 53, via the OR-gate 52, so that the data word on the input B is also conducted further without modification, via the multiplexer 44, and both data words are added without carry. However, if the line 15 carries a logic "1" in conformity with k=+1, the line 53 carries a logic "0" so that the multiplexer applies the complement of the data word on the input B to the adder 40 which also receives, on the carry input 41, a carry signal so that A-B appears on the output. For the second function mentioned the line i carries a logic "0" and the line j carries a logic "1", so that in the case of a logic "0" on the line 15 the sum of the two data words on the inputs A and B is formed again, whereas in the case of a logic "1" on the line 15, corresponding to k=+1, the difference B-A is formed on the output z of the adder 40. Thus, it is decided by the content of the register 14 which appears at the output 15 whether the add/subtract unit 10 forms the sum or the difference of the two data words applied (the register being constructed as an end around shift register), the signals on the lines i and j, generated in dependence on the special instructions, determining the sign of this difference, so that each of these arithmetical functions can be formed in only one instruction clock cycle.

When both lines i and j carry a logic "0", further inputs (not shown) of the multiplexers 42 and 44, preferably controlled by the control device 12 of FIG. 1, can determine whether the add/subtract unit 10 forms the sum or the difference of the data words applied.

The device shown in FIG. 1, exhibiting the details of FIG. 2, thus simply enables the formation of the sum of products of a concatenation of data word pairs when the one data word of each pair can assume only the values +1 and −1, one data word pair being processed per instruction cycle.

We claim:

1. A circuit for forming the sum of products of a concatenation of data word pairs, comprising:

means for supplying first and second data words of the data word pairs, each of the first data words represented by a sign value;

an add/subtract device having two data inputs, a first control input, a second control input and an output, for performing one of addition and subtraction in response to control signals received at the first control input and the second control input;

at least one accumulator register having an input coupled to the output of the add/subtract device and having an output coupled to one data input of the two data inputs of said add/subtract device;

a shift register having a predetermined number of stages, having parallel inputs and having a serial output coupled to the first control input of the add/subtract device for storing, in parallel, sign values of the first data words of at least part of the concatenation of data word pairs, each sign value being bit-wise shiftable by a shift control signal; and a control device coupled to said supplying means and to said shift register to control a transfer of the first data words of the at least part of the concatenation of data word pairs in parallel to the parallel inputs of said a shift register, to control writing of the first data words into the stages of said a shift register and to supply shift control signals to said a shift register and control transfer of the second data words to the other data input of said add/subtract device.

2. A circuit arrangement as claimed in claim 1, wherein:

contents of said shift register can be shifted in a selectable direction in dependence on further control signals from said control device; and said shift register is closed as an end-around coupled shift register.

3. A circuit arrangement as claimed claim 1, wherein:

the function of said add/subtract device is controlled, via the control input connected to the output of the shift register, in response to a second control signal received at a second control input of said add/subtract device, supplied from the control device.

4. A circuit arrangement as claimed in claim 3, wherein the output of the shift register is connected to the first control input of said add/subtract device via a logic circuit which receives the second control signal from said control device.

5. A circuit arrangement as claimed claim 2, wherein:

the function of said add/subtract device is controlled, via the control input connected to the output of the shift register in response to control signals received at the second control input of said add/subtract device, supplied from the control device.

6. A circuit arrangement as claimed in claim 2, used in a processor comprising at least one data bus, wherein the stages of said shift register are coupled to a data bus and receive data present on the data bus under control of a third control signal from said control device.

7. A circuit arrangement as claimed in claim 1, used in a processor comprising at least one data bus, wherein the stages of said shift register are coupled to a data bus and receive data present on the data bus under control of a third control signal from said control device.

8. A circuit arrangement as claimed in claim 7, characterized in that the control device, as an instruction decoder, generates an active value of the first and the second control signal only in response to the appearance of a predetermined instruction code.

* * * * *